E. L. DENNIS.
PACKAGE CARRIER FOR BICYCLES.
APPLICATION FILED JAN. 6, 1913.
1,094,885.
Patented Apr. 28, 1914.
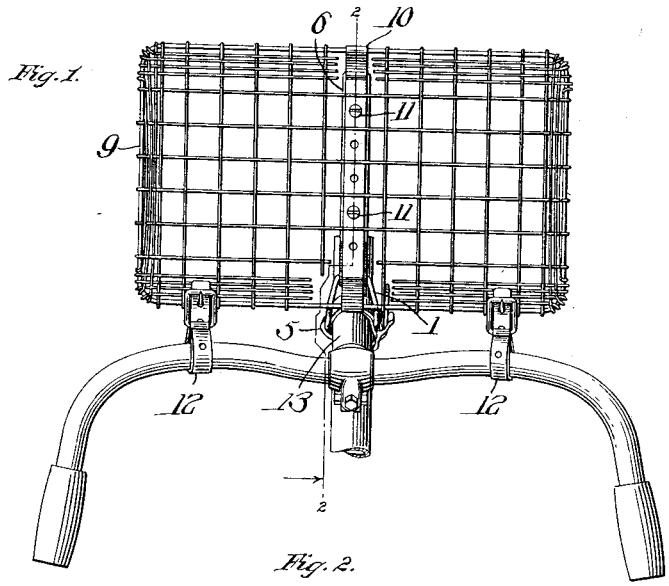
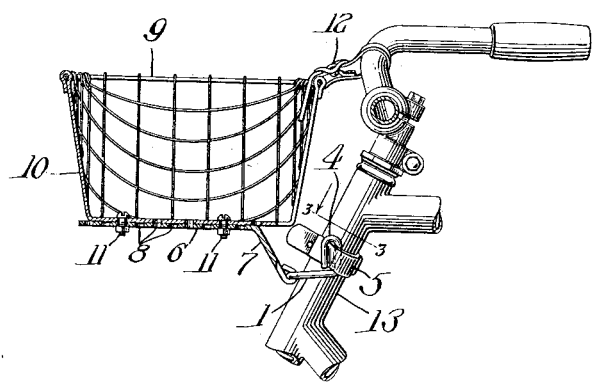
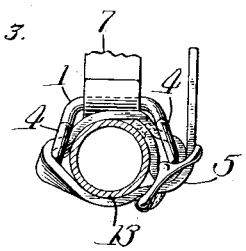

UNITED STATES PATENT OFFICE.

ELMER L. DENNIS, OF ROCKFORD, ILLINOIS, ASSIGNOR TO ANDREWS WIRE & IRON WORKS, OF ROCKFORD, ILLINOIS, A CORPORATION OF ILLINOIS.

PACKAGE-CARRIER FOR BICYCLES.

1,094,885.  Specification of Letters Patent.  Patented Apr. 28, 1914.

Application filed January 6, 1913. Serial No. 740,398.

*To all whom it may concern:*

Be it known that I, ELMER L. DENNIS, a citizen of the United States, residing at Rockford, in the county of Winnebago and the State of Illinois, have invented certain new and useful Improvements in Package-Carriers for Bicycles, of which the following is a specification.

This invention relates to package carriers adapted to be attached to the front of a bicycle, and the object is to construct such a carrier that shall be simple and inexpensive to manufacture, capable of adjustment relative to the distance between the carrier and the bicycle frame, and that shall be adapted to be attached to any make and size of bicycle.

In the accompanying drawings: Figure 1 is a plan view of the package carrier attached to a bicycle, a portion of the wire basket being broken away. Fig. 2 is a vertical section on the line 2—2 of Fig. 1. Fig. 3 is a plan section on the line 3—3 of Fig. 2.

A yoked link 1 is formed with upturned ends 4 forming eyes through which a strap 5 is passed to secure the link to the guide-post 13 of a bicycle, in a manner as is clearly shown in the drawings.

The basket supporting member 6 has a downturned end 7 which is bent around the link 1 forming a pivotal connection therewith, and the support 6 is formed with a plurality of spaced holes 8.

The basket or receptacle 9 is of a wire construction and has a centrally located strip 10 which is secured to the top rim-wire, is bent to conform to the cross-sectional shape of the basket and has a plurality of spaced holes formed in the bottom section that are in alinement with certain of the holes in the support 6. The screw and nut connections 11 secure the strip 10 to the support 6. The strap and buckle connections 12 between the rim-wire of the basket and the handlebars of the bicycle hold the basket in a horizontal position.

The basket, as has been described, is supported by the member 6 which is pivotally supported and can be raised or lowered by the adjustment of the link connection to suit the bicycle to which it is applied. Also the basket can be adjusted to different positions longitudinally on the support by removing the screw connections, shifting the basket to the desired position and then fastening it in such position by entering the screws in the new holes. The basket is always capable of a horizontal position as the connection straps 12 may be adjusted to suit the position of the basket.

It will be seen that with a package carrier of this simple and novel construction, very desirable adjustable features are obtained, also the carrier is inexpensive to manufacture and withstands very satisfactorily the usage that an article of this sort is given.

I claim—

1. A package receptacle for bicycles comprising, a receptacle, a bracket adapted to be adjustably attached to the guide-post of a bicycle, a member connected to the receptacle and having an end extending therefrom, said end being pivotally connected to said bracket on a horizontally disposed axis whereby said receptacle may move vertically from said pivotal connection, and adjustable connections adapted to connect the receptacle with the steering-handles of a bicycle, said connections being movable to allow for the said vertical movement of the receptacle.

2. A package receptacle for bicycles comprising, a receptacle, a supporting member fixed with the receptacle and having a loose pivotal connection on a horizontally disposed axis fixed with the guide-post of a bicycle, and vertically movable flexible connections between the top portion of the receptacle and the bicycle to allow the receptacle to move vertically from its said pivotal support.

3. A package carrier for bicycles comprising a link adjustably secured to the guide-post of a bicycle, a package receptacle, a receptacle support having an adjustable connection with the bottom of the receptacle allowing same to be adjusted longitudinally thereon and the support having one end loosely pivotally connected to said link on a horizontally disposed axis, whereby the receptacle may move vertically from said pivotal connection, and adjustable connections attached to the top of the receptacle to hold the receptacle in position.

4. A package carrier for bicycles comprising a yoked link having eyes formed at its ends, the link being adapted to straddle the guide-post of a bicycle and to be attached thereto by a strap passing through said eyes, a package receptacle, a receptacle support having a pivotal connection with said link, and adjustable connections attached to the receptacle and bicycle to hold the receptacle in position.

5. A package carrier for bicycles comprising a bracket adjustably secured to the guide-post of a bicycle, a package receptacle, a receptacle support adapted to be adjustably secured to the bottom of said receptacle allowing the receptacle to be adjustable longitudinally thereon and the support having a downturned end which has a loose pivotal connection with said bracket on a horizontally disposed axis, whereby the receptacle may move vertically from said pivotal connection, and adjustable connections between the top of the receptacle and the bicycle to hold the receptacle in position.

In testimony whereof I have hereunto set my hand in presence of two subscribing witnesses.

ELMER L. DENNIS.

Witnesses:
J. WARREN BATE,
CHARLES ANDREWS, Jr.

Copies of this patent may be obtained for five cents each, by addressing the "Commissioner of Patents, Washington, D. C."